(12) United States Patent
Matsunaga et al.

(10) Patent No.: US 9,811,888 B2
(45) Date of Patent: Nov. 7, 2017

(54) IMAGE PROCESSING APPARATUS AND IMAGE PROCESSING METHOD

(71) Applicant: OMRON Corporation, Kyoto-shi, Kyoto (JP)

(72) Inventors: Jumpei Matsunaga, Kusatsu (JP); Masayuki Kobayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/610,267

(22) Filed: Jan. 30, 2015

(65) Prior Publication Data
US 2015/0262342 A1 Sep. 17, 2015

(30) Foreign Application Priority Data

Mar. 14, 2014 (JP) .................. 2014-051799

(51) Int. Cl.
*G06K 9/46* (2006.01)
*G06T 5/00* (2006.01)
(Continued)

(52) U.S. Cl.
CPC ............ *G06T 5/005* (2013.01); *G06K 9/0061* (2013.01); *G06K 9/00268* (2013.01); *G06T 5/40* (2013.01); *H04N 1/624* (2013.01); *G06T 2207/20172* (2013.01); *G06T 2207/30201* (2013.01); *G06T 2207/30216* (2013.01)

(58) Field of Classification Search
None
See application file for complete search history.

(56) References Cited

U.S. PATENT DOCUMENTS

| 5,748,764 A | 5/1998 | Benati et al. |
| 7,894,666 B2 | 2/2011 | Mitarai et al. |

(Continued)

FOREIGN PATENT DOCUMENTS

| CN | 1993707 A | 7/2007 |
| JP | 2002-269545 | 9/2002 |

(Continued)

OTHER PUBLICATIONS

Huang et al, An improved Image Segmentation Algorithm Based on the Otsu Method, IEEE 2012.*

(Continued)

*Primary Examiner* — Mark Roz
(74) *Attorney, Agent, or Firm* — Osha Liang LLP

(57) ABSTRACT

An image processing apparatus configured to correct at least part of a face image has an image acquisition unit that acquires an input image, a region extraction unit that extracts a pupil region, which is a region corresponding to an eye of a person, from the input image, a pixel extraction unit that extracts a pixel from the pupil region whose brightness value is higher than a threshold value, a determination unit that determines, based on the result of extraction performed by the pixel extraction unit, whether or not halation has occurred in the pupil region, and a correction unit that performs, based on the result of determination performed by the determination unit, processing for correcting halation on the pupil region. The pixel extraction unit sets the threshold value based on a bias of a brightness distribution of the pixels included in the pupil region.

10 Claims, 13 Drawing Sheets

(51) Int. Cl.
G06K 9/00 (2006.01)
G06T 5/40 (2006.01)
H04N 1/62 (2006.01)

(56) References Cited

U.S. PATENT DOCUMENTS

| | | | |
|---|---|---|---|
| 8,260,081 B2 | 9/2012 | Takagi | |
| 2009/0169101 A1* | 7/2009 | Mitarai | ............... G06K 9/0061 |
| | | | 382/167 |

FOREIGN PATENT DOCUMENTS

| | | |
|---|---|---|
| JP | 2006-040230 A | 2/2006 |
| JP | 2007-235531 A | 9/2007 |
| JP | 2010-103820 A | 5/2010 |
| JP | 4537142 B2 | 9/2010 |

OTHER PUBLICATIONS

Remove Red Eye From Your Digital Photos, last-updated timestamp 2008).*
Office Action issued in corresponding Korean Application No. 10-2015-0012002, mailed on Oct. 20, 2015 (8 pages).
Extended European Search Report issued in corresponding Euopean Application No. 15153014.4, mailed on Nov. 23, 2015 (11 pages).
Office Action issued in counterpart Chinese Patent Application No. 201510050135.3, dated Jul. 18, 2017 (16 pages).

* cited by examiner

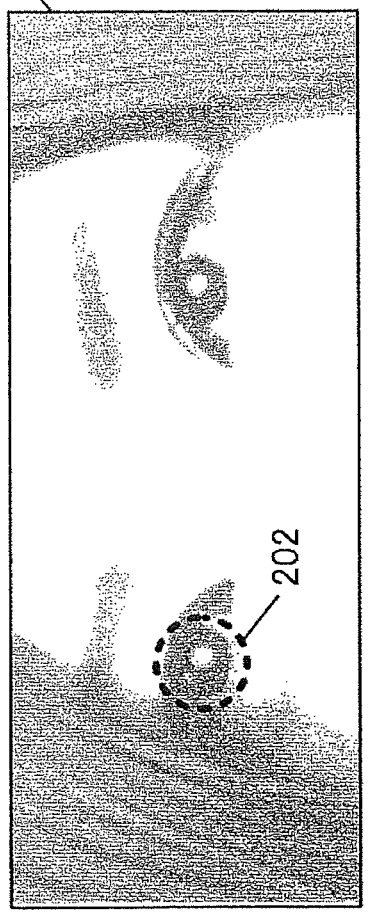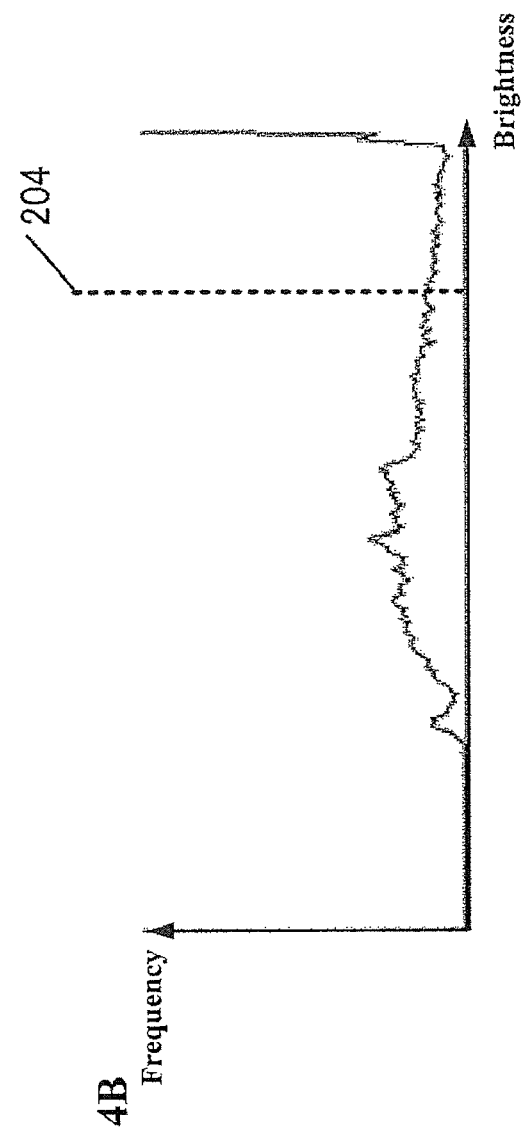
FIG. 4A
FIG. 4B

IMAGE PROCESSING APPARATUS AND IMAGE PROCESSING METHOD

CROSS-REFERENCE TO RELATED APPLICATION

This application claims the benefit of Japanese Patent Application No. 2014-051799, filed on Mar. 14, 2014, which is hereby incorporated by reference herein in its entirety.

BACKGROUND OF THE INVENTION

Field of the Invention

The present invention relates to an image processing apparatus configured to correct an image in which a brightness defect has occurred.

Description of the Related Art

If an image capturing apparatus such as a camera captures an image of a person's face by emitting a flash, the flash causes a tone defect phenomenon in which the person's pupils appear red (red-eye phenomenon) to occur. In order to address this, many techniques for correcting an image in which a red-eye phenomenon has occurred and adjusting it to its original tone have been proposed. For example, JP 2007-235531A discloses a digital camera according to which a region in which red-eye has occurred is detected in a captured image and tone correction is performed on the region.

Halation is an example of a phenomenon other than the red-eye phenomenon. Halation is a phenomenon in which blown-out highlights appear in a pupil due to the flash being reflected strongly in the pupil. When halation occurs, tone brightness information and iris pattern information are lost, and therefore cannot be corrected with processing similar to that of red-eye correction.

For example, for correcting halation, JP 4537142B discloses an image processing method of separately extracting a region in which red-eye has occurred and a region in which halation has occurred, and subjecting them to correction using respectively different methods.

JP 2007-235531A and JP 4537142B are examples of background art.

In the method disclosed in JP 4537142B, pixels having a brightness value greater than or equal to a threshold value are extracted from a region in which a tone defect has occurred, and it is determined that halation has occurred in the pixels.

However, when determining the occurrence of halation using a fixed threshold value, incorrect determination is likely to occur. In other words, if all of the pixels are brighter, the number of pixels having brightness values greater than or equal to the threshold value will increase, and therefore there is a risk that it will be determined that halation has occurred even if halation has not occurred. The inverse is similarly true, in that if the entire image is underexposed and dark, there is a risk that no brightness values will exceed the threshold value and it will consequently be determined that halation has not occurred, even if halation has occurred.

This occurs not only due to the lightness or darkness of the image, but also due to individual differences between imaged people. For example, in the case of an iris with a light color such as blue, the brightness values of the pixels will be higher compared to the case of an iris with a dark color such as brown. In other words, the probability of a determination that halation has occurred will increase even if the state of halation is the same.

SUMMARY

One or more embodiments of the present invention provides an image processing apparatus that can correctly determine a state of halation that has occurred in an eye.

According to one or more embodiments of the present invention, an image processing apparatus is configured to correct at least part of a face image, and comprises an image acquisition unit configured to acquire an input image; a region extraction unit configured to extract a pupil region, which is a region corresponding to an eye of a person, from the input image; a pixel extraction unit configured to, in the pupil region, extract a pixel whose brightness value is higher than a threshold value; a determination unit configured to, based on the result of extraction performed by the pixel extraction unit, determine whether or not halation has occurred in the pupil region; and a correction unit configured to, based on the result of determination performed by the determination unit, perform processing for correcting halation on the pupil region, wherein the pixel extraction unit sets the threshold value based on a bias of a brightness distribution of the pixels included in the pupil region.

The image processing apparatus according to one or more embodiments of the present invention is an apparatus that extracts a pupil region from an input image, determines whether or not halation has occurred in the pupil region, and subsequently performs halation correction. A pupil region is a region corresponding to a person's pupil and is typically a circular region in which the central point of the pupil is the central coordinate. However, the present invention is not limited to this.

It is possible to determine whether or not halation has occurred by, in the pupil region, extracting pixels whose brightness value is higher than a threshold value. In one or more embodiments of the present invention, the threshold value is set based on the bias of the brightness distribution of the pixels included in the pupil region.

For example, if the distribution is biased toward a high brightness side, the threshold value is set to a higher brightness, and if the distribution is biased toward a low brightness side, the threshold value is set to a lower brightness. Also, if the brightness distribution has multiple peaks, or in other words, if the distribution is divided into a high brightness class and a low brightness class, the threshold value may be set to a value according to which the classes are divided.

According to this configuration, it is possible to suppress incorrect determination whether or not halation has occurred caused by the bias of the brightness distribution of the pixels.

Also, if the pixels extracted by the pixel extraction unit make up a predetermined percentage or more of the pixels in the pupil region, the determination unit may determine that halation has occurred in the pupil region.

If halation has occurred in the pupil region, the number of pixels whose brightness value is greater than a threshold value is larger compared to the case where only highlights exist in the pupil region. In other words, it is possible to estimate whether or not halation has occurred by determining the percentage of these pixels in the pupil region.

Also, the threshold value may be a value according to which the brightness distribution of the pixels included in the pupil region is separated into a high brightness class and a low brightness class.

If halation has occurred, the brightness distribution will protrude on the high brightness side. In other words, by setting the threshold value to a value according to which a high brightness class, which is the class corresponding to the halation, and a low brightness class, which is a class other than the high brightness class, are separated, it is possible to improve the accuracy of halation determination. Class separation can be performed using any method.

Also, the determination unit may calculate a degree of separation, which is a ratio between an intra-class variance and an inter-class variance in the brightness distribution of the pixels included in the pupil region and set the threshold value to a value according to which the degree of separation is maximized.

In one or more embodiments of the present invention, the separation of the high brightness class and the low brightness class is performed using discriminant analysis. Specifically, the ratio between the intra-class variance and the inter-class variance is obtained as the degree of separation, and a threshold value is obtained according to which the degree of separation is maximized. The thus-obtained threshold value is a value according to which the classes are separated most favorably.

Also, if the degree of separation is less than or equal to a predetermined value and the average of the brightness values of the pixels included in the pupil region is greater than or equal to a predetermined value, the correction unit may perform halation correction processing regardless of the result of the determination performed by the determination unit.

Also, if the degree of separation is less than or equal to a predetermined value and the average of the brightness values of the pixels included in the pupil region is less than or equal to a predetermined value, it is possible for the correction unit to not perform halation correction processing regardless of the result of the determination performed by the determination unit.

Having a low degree of separation in the brightness distribution means that an independent halation region in the pupil region cannot be detected. In other words, either no halation at such a level as to be corrected has occurred, or halation has occurred over the entire pupil region.

It is possible to distinguish between these two states by obtaining the average of the brightness values of the pixels included in the pupil region. For example, if the average of the brightness values of the pixels included in the pupil region is higher than a predetermined value, it can be estimated that halation has occurred over the entire pupil region. In such a case, according to one or more embodiments of the present invention, halation correction processing is performed on the pupil region regardless of the result of the determination performed by the determination unit. Also, if the average of the brightness values of the pixels included in the pupil region is lower than a predetermined value, it can be estimated that halation requiring correction has not occurred. In such a case, according to one or more embodiments of the present invention, halation correction processing is not performed on the pupil region regardless of the result of the determination performed by the determination unit.

With this kind of configuration, it is possible to appropriately detect the occurrence of halation and perform correction, even if the degree of separation in the brightness distribution is low.

Also, the correction unit may store a pupil image corresponding to a pupil region, and if halation occurs in a pupil region, perform halation correction by pasting the corresponding pupil image on the target pupil region.

Halation correction can be performed by pasting a pupil image in a normal state on a target pupil region.

Also, the correction unit may deform the pupil image into a shape matching that of a target pupil region and thereafter paste it on the pupil region, and the correction unit may correct the pupil image to a tone matching that of a target pupil region and thereafter paste it on the pupil region.

Thus, by pasting the pupil image after correcting the shape and tone thereof, it is possible to obtain a more natural correction result.

Also, if halation occurs in a first pupil region and halation does not occur in a second pupil region that is a pupil region of an eye opposite to that of the first pupil region, the correction unit may perform halation correction by pasting a pupil image acquired from the second pupil region on the first pupil region.

Thus, if halation has occurred in only one of two eyes, it is possible to acquire a pupil image in a normal state from the pupil region of the other eye.

According to one or more embodiments of the present invention, an image processing apparatus is configured to correct halation that has occurred in a face image, and comprises an image acquisition unit configured to acquire an input image; a region extraction unit configured to extract a pupil region, which is a region corresponding to an eye of a person, from the input image; a determination unit configured to determine whether or not halation has occurred in the pupil region; and a correction unit configured to, in the case where halation has occurred in the pupil region, perform halation correction by pasting a corresponding pupil image on the target pupil region.

According to this configuration, it is possible to provide an image processing apparatus capable of halation correction according to which the user feels little discomfort.

Note that one or more embodiments of the present invention can be specified as an image processing apparatus including at least a portion of the above-described units. Also, one or more embodiments of the present invention can be specified as an image processing method. Also, one or more embodiments of the present invention can be specified as a program for causing a computer to execute the above-described image processing method. The processing and units described above can be implemented in any combination as long as no technical conflicts occur.

According to one or more embodiments of the present invention, it is possible to provide an image processing apparatus capable of correctly determining a state of halation that has occurred in an eye.

BRIEF DESCRIPTION OF THE DRAWINGS

FIGS. 4A-4B show an example of a face image and a brightness value histogram in a state of over-exposure.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details In other instances, well-known features have not been described in detail to avoid obscuring the invention.

Figure 1:
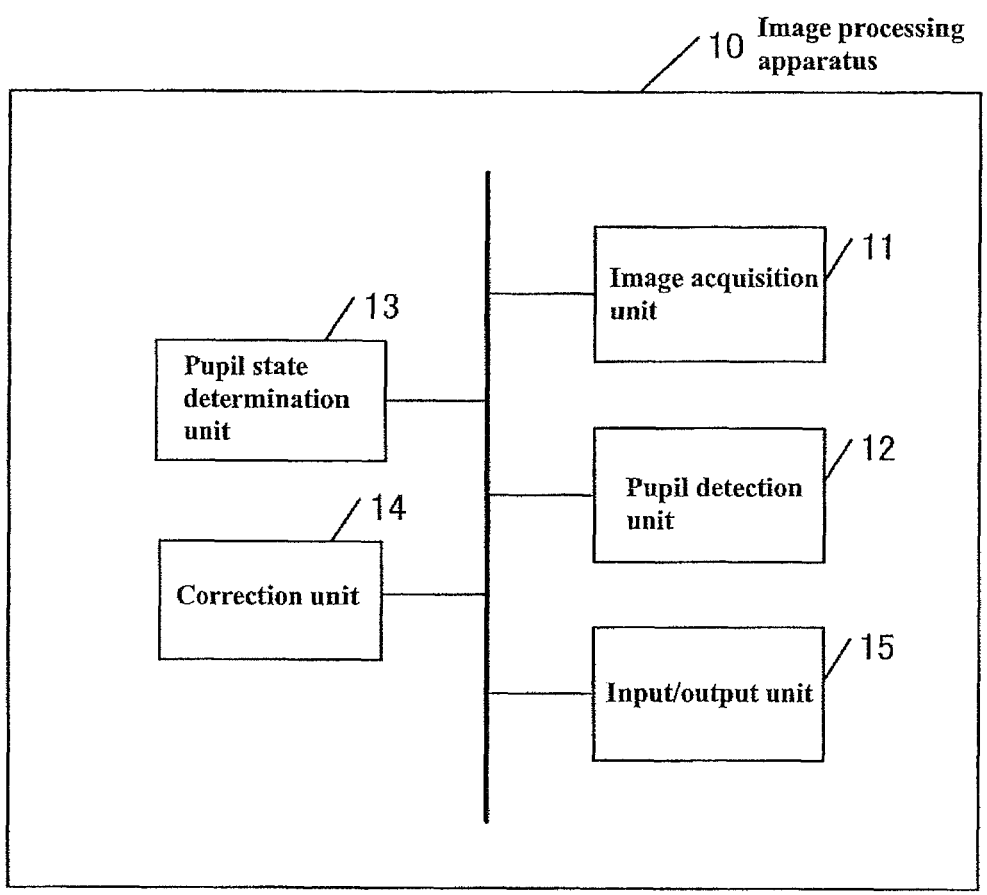
FIG. 1 is a diagram showing a system configuration of an image processing apparatus according to one or more embodiments of the present invention.

The image processing apparatus according to one or more embodiments of the present invention is an apparatus that, upon detecting that a tone abnormality or a brightness abnormality has occurred in a pupil of a person included in an image, performs correction on the pupil. FIG. 1 is an image of a system configuration of an image processing apparatus 10 according to one or more embodiments of the present invention.

System Configuration

The image processing apparatus 10 is constituted by an image acquisition unit 11, a pupil detection unit 12, a pupil state determination unit 13, a correction unit 14, and an input/output unit 15.

The image acquisition unit 11 is a unit configured to acquire an image that is to be subjected to processing, and is typically a storage device such as a fixed disk drive or a flash memory. Note that the image acquisition unit 11 may be a unit configured to acquire an image from an external apparatus (e.g., an interface apparatus or a wireless communication apparatus), and it may be a unit configured to capture an image via a lens or an image sensor.

The pupil detection unit 12 is a unit configured to extract a region corresponding to a person's pupil from an image acquired by the image acquisition unit 11. Specifically, upon detecting a person's face from the image and clipping an image in which both eyes are included, the positions of the eyes are specified in the image and the central points of the pupils are determined. Also, a circular region centered on a central point of a pupil (referred to below as a "pupil region") is extracted. Note that in the present specification, the word "pupil region" is used as a word expressing a region having a predetermined size whose central coordinate is the central point of a pupil.

The pupil state determination unit 13 is a unit configured to determine the state of the pupil region extracted by the pupil detection unit 12. Specifically, it determines whether or not red-eye has occurred, whether or not gold-eye has occurred, and whether or not halation has occurred. The determination method will be described in detail later. Note that gold-eye is a tone defect phenomenon in which a pupil appears yellow due to principles similar to those causing red-eye.

The correction unit 14 is a unit configured to perform correction of red-eye or gold-eye and halation based on the result of determination performed by the pupil state determination unit 13. Note that the region that is to be subjected to correction by the correction unit 14 need not necessarily be the same as the pupil region. For example, it may be a region obtained by removing a region corresponding to skin from the pupil region.

Note that the input/output unit 15 is a unit configured to receive an input operation performed by a user and present information to the user. Specifically, it is constituted by a touch panel, a control unit for the touch panel, a liquid crystal display, and a control unit for the liquid crystal display. The touch panel and the liquid crystal display are composed of one touch panel display in one or more embodiments of the present invention.

Control of the units described above is realized by a processing device such as a CPU executing a control program. Also, the control function may be realized by an FPGA (Field Programmable Gate Array), an ASIC (Application Specific Integrated Circuit), or the like, or a combination thereof.

First, conventional techniques will be described.

Figure 2A:
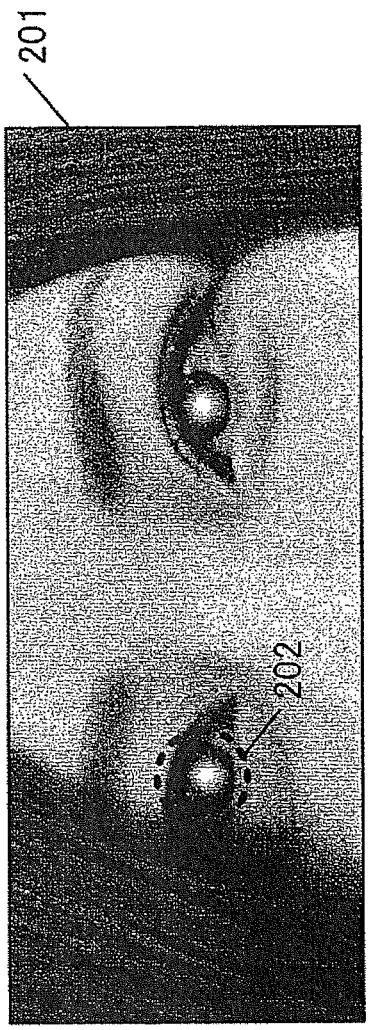
FIGS. 2A-2B show an example of a face image and a brightness value histogram.

An image 201 shown in FIG. 2A is an example of an image obtained by cutting out a region around the eyes from an image of a person acquired by the image acquisition unit 11. Reference numeral 202 is a region corresponding to a pupil (a pupil region). Here, it is assumed that halation caused by flash reflection has occurred in the pupil region 202.

Figure 2B:
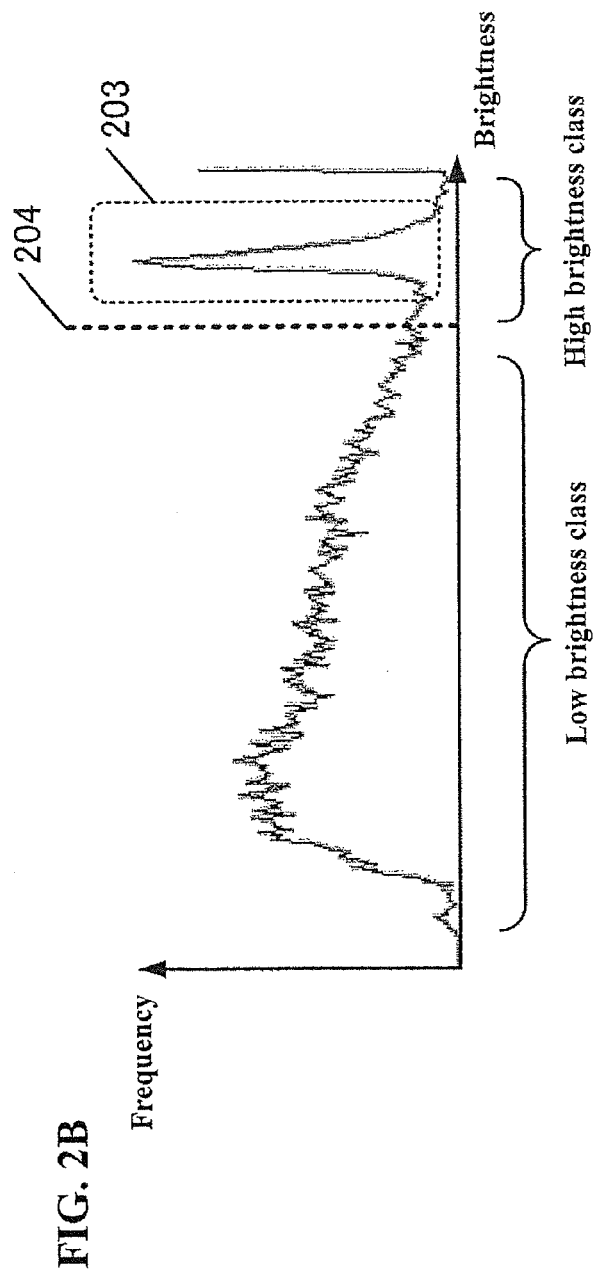

FIG. 2B is a brightness value histogram for the pixels included in the pupil region 202. Although the image 201 is an RGB image, a histogram for a monochrome image is illustrated here in order to simplify the description. The horizontal axis of the histogram indicates brightness values, and the vertical axis indicates frequency (number of pixels).

The distribution of brightness can be used to determine whether or not halation has occurred in the pupil region. If halation has occurred, the brightness distribution will protrude on the high brightness side. In this example, the portion indicated by reference numeral 203 is a protruding portion in the brightness distribution caused by halation. Also, a determination that the brightness distribution protrudes on the high brightness side can be made based on the percentage of pixels having a brightness value that exceeds a threshold value. For example, if the number of pixels whose brightness value is higher than a threshold value 204 is not less than a predetermined percentage (e.g., not less than 20%) of the pixels included in the pupil region 202, it can be determined that halation has occurred in the pupil region.

Figure 3A:
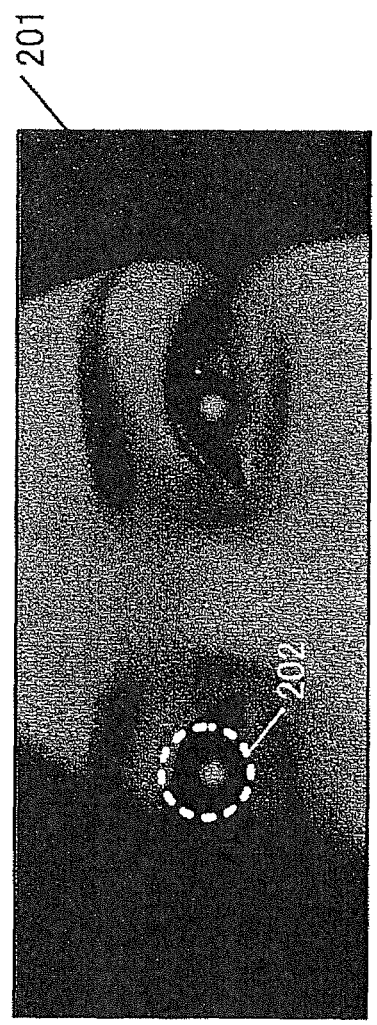
FIGS. 3A-3B show an example of a face image and a brightness value histogram in a state of under-exposure.
Figure 3B:
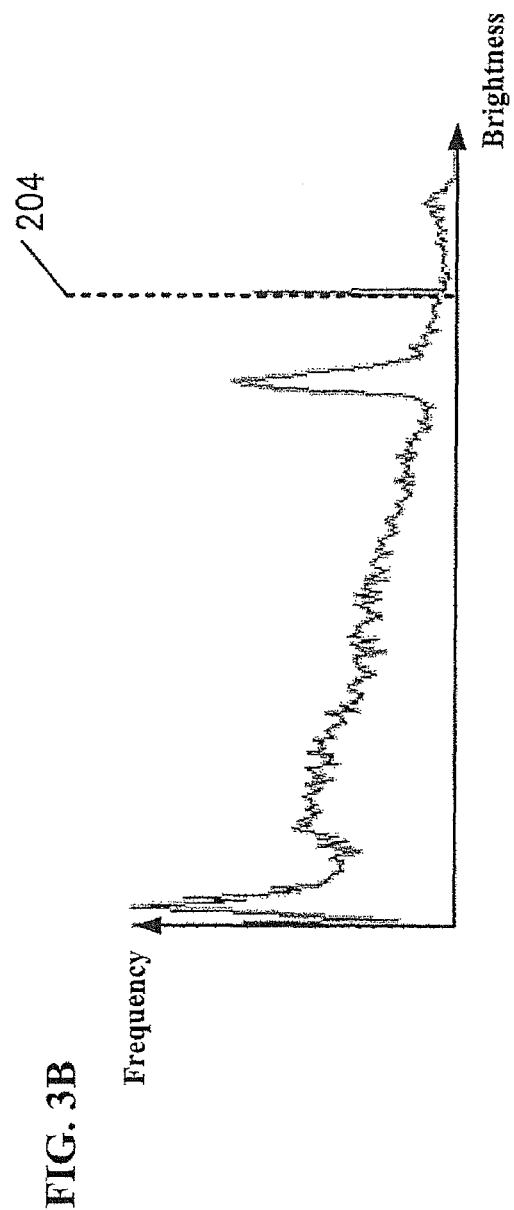

If the brightness distribution is biased in a specific direction, it will no longer be possible to correctly determine halation. FIGS. 3A-3B show an example of a case in which the brightness distribution is biased in the low brightness direction, or in other words, a case in which the entire image is in a state of under-exposure. In such a case, since the portion in which the brightness distribution protrudes moves to the low brightness side, the percentage of pixels whose brightness is higher than the threshold value 204 decreases. In other words, there is a risk that it will be determined that halation has not occurred, even if halation has occurred.

By contrast, FIGS. 4A-4B show an example of a case in which the brightness distribution is biased in the high brightness direction, or in other words, a case of a state of over-exposure. In such a case, since the entirety of the brightness distribution moves to the high brightness side, the percentage of pixels whose brightness is higher than the threshold value 204 increases. In other words, there is a risk that it will be determined that halation has occurred even if halation has not occurred.

This is caused not only by the exposure state, but also by differences in iris color. For example, if the iris of a target person is brightly-colored, the brightness values will shift in the high brightness direction, compared to the case of a dark-colored iris. In other words, an incorrect determination similar to that described above can occur.

In this way, with a method in which a static threshold value is used, a case occurs in which it is not possible to correctly determine that halation has occurred due to the state of the brightness distribution.

Threshold Value Determination Method

In view of this, with the image processing apparatus according to one or more embodiments of the present invention, a method is used in which the threshold value is set dynamically based on the bias of the brightness distribution of the pixels included in the pupil region. A specific method will be described below.

As described above, if halation has occurred, the brightness distribution will protrude on the high brightness side. In other words, if the threshold value is set to a value according to which the histogram peak on the high brightness side and the histogram peak on the low brightness side are separated, it is possible to correctly determine the occurrence of halation.

Figure 5:
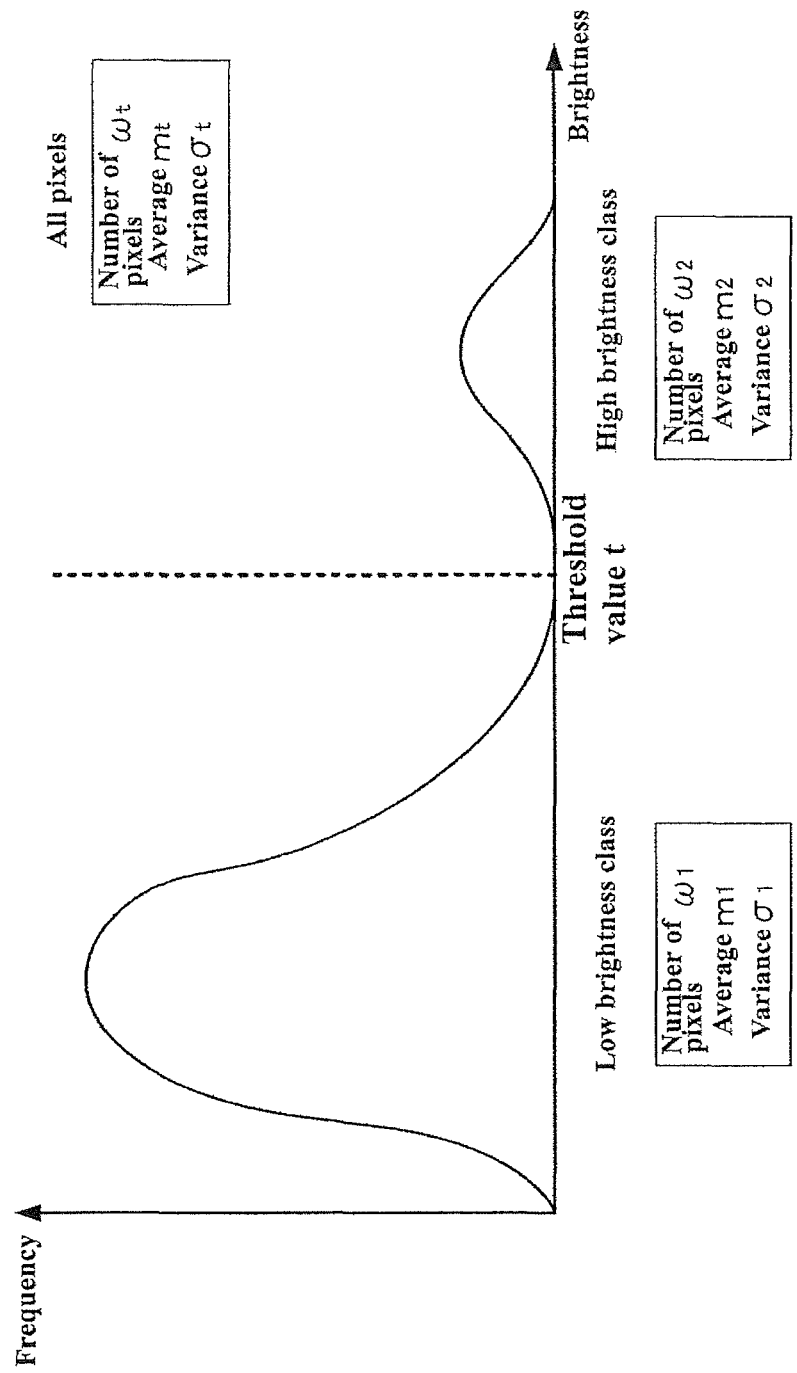
FIG. 5 is an image for describing a method for separating a brightness distribution using discriminant analysis.

A description will be given below with reference to FIG. 5. Here, when a threshold value t is set in the brightness distribution, the class in which the brightness values are lower than the threshold value t is a low brightness class, and the class in which the brightness values are higher than the threshold value t is a high brightness class. Also, let $\omega_1$, $m_1$, and $\sigma_1$ be the number of pixels, the average of the brightness values, and the variance of the brightness values respectively in the low brightness class, and let $\omega_2$, $m_2$, and $\sigma_2$ be the number of pixels, the average of the brightness values, and the variance of the brightness values respectively in the high brightness class. Also, let $\omega_t$, $m_t$, and $\sigma_t$ be the number of pixels, the average of the brightness values, and the variance of the brightness values respectively of all pixels included in the pupil region.

By defining the variables in this manner, the total value of the variances of the classes (intra-class variances) can be expressed using equation 1. Also, the variance of the average values of the classes (inter-class variance) can be expressed using equation 2. Also, the overall variance is the total value of the above-described intra-class variance and the inter-class variance.

$$\sigma_w^2 = \frac{\omega_1 \sigma_1^2 + \omega_2 \sigma_2^2}{\omega_1 + \omega_2} \quad \text{Equation 1}$$

$$\sigma_b^2 = \frac{\omega_1(m_1 - m_t)^2 + \omega_2(m_2 - m_t)^2}{\omega_1 + \omega_2} = \frac{\omega_1 \omega_2 (m_1 - m_2)^2}{(\omega_1 + \omega_2)^2} \quad \text{Equation 2}$$

The smaller the intra-class variance is, the closer together the data is, and the smaller the inter-class variance is, the closer the centers of the classes are to each other. In other words, by using these proportions, it is possible to express how separated the low brightness class and the high brightness class are from each other (degree of separation). The degree of separation can be expressed using equation 3.

$$\frac{\sigma_b^2}{\sigma_w^2} = \frac{\sigma_b^2}{\sigma_t^2 - \sigma_b^2} \quad \text{Equation 3}$$

Note that since the overall variance is constant regardless of the threshold value t, by obtaining a threshold value t according to which the inter-class variance is maximized, it is possible to obtain a threshold value t according to which the degree of separation is maximized. Moreover, since the denominator for the inter-class variance is also constant regardless of the threshold value t, if a threshold value t according to which $\omega_1 \omega_2 (m_1 - m_2)^2$ is maximized is obtained, the value of that t will most favorably separate the low brightness class and the high brightness class. This type of method is called "discriminant analysis".

The image processing apparatus according to one or more embodiments of the present invention uses the thus-obtained threshold value t to calculate the percentage of pixels corresponding to the high brightness class among the pixels included in the pupil region and determine halation. Thus, by dynamically setting the threshold value t, it is possible to accurately determine whether or not halation has occurred in the pupil region.

Processing in the case of a low degree of separation

The above-described processing is advantageous in the case where the brightness distribution is sufficiently separated into a low brightness class and a high brightness class. On the other hand, if the brightness distribution is not sufficiently separated into a low brightness class and a high brightness class, correction of halation cannot be correctly performed in some cases because of incorrectly determination whether or not halation has occurred.

The processing method in such a case will be described below.

Figure 6:
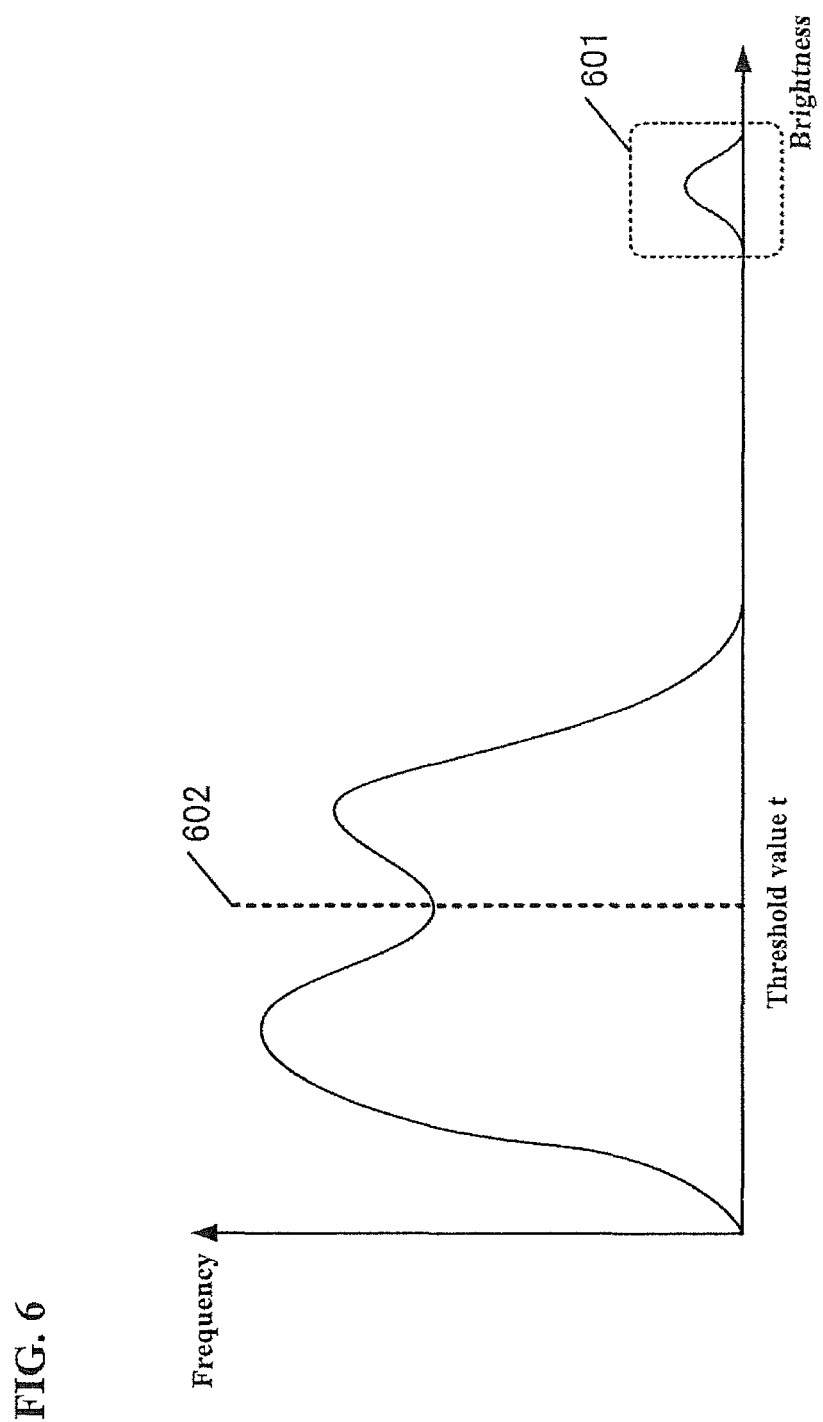
FIG. 6 is an image for describing an example in which halation determination cannot be performed correctly.

FIG. 6 shows an example of a case in which the distribution is biased in the low brightness direction. In this case, the class representing the flash reflection is indicated by reference numeral 601. A reflection of this level is a normal highlight, not halation. However, with the above-described method, the threshold value t will end up being set at an undesirable position, such as the position indicated by reference numeral 602. As a result, it is incorrectly determined that halation has occurred in the pupil region in some cases.

Figure 7:
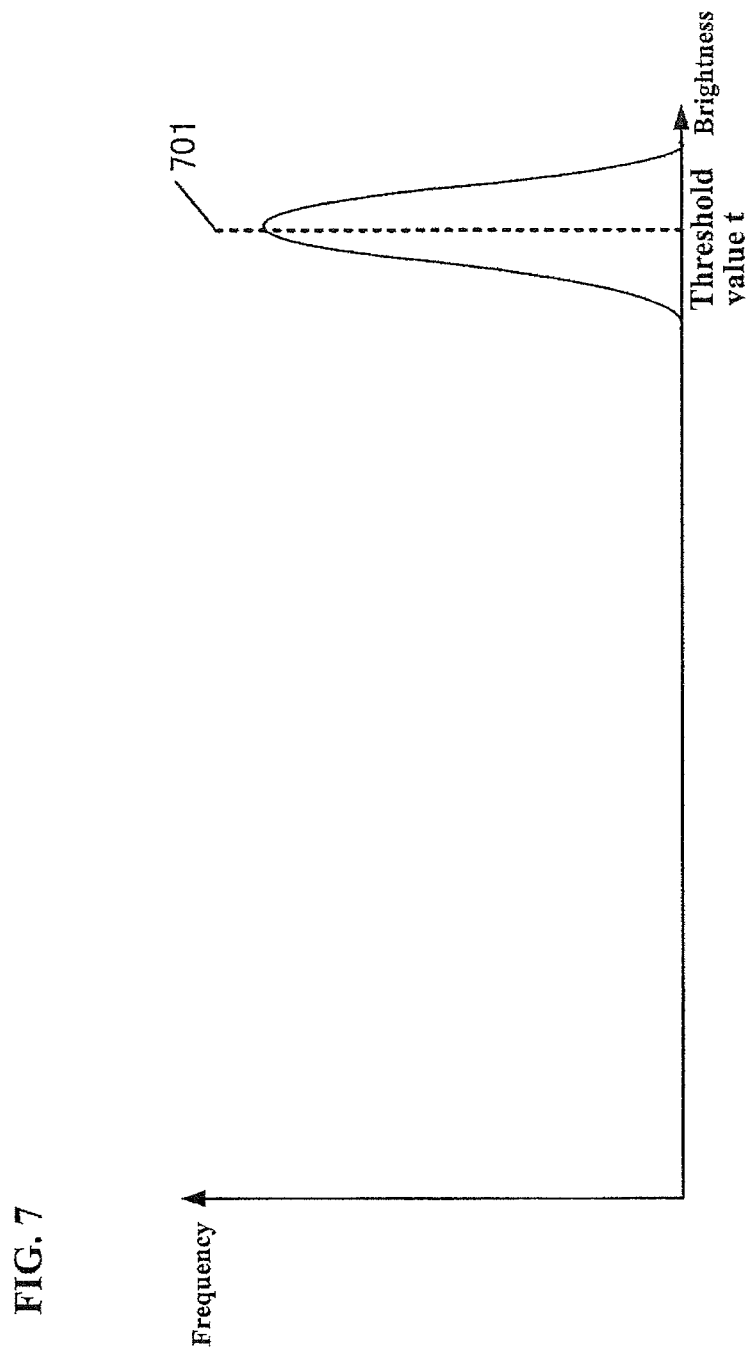
FIG. 7 is a second image for describing an example in which halation determination cannot be performed correctly.

FIG. 7 shows an example of a case in which the distribution is biased in the high brightness direction. If halation has occurred over the entirety of the pupil region, the brightness distribution will be biased in the high brightness direction, as shown here. However, with the above-described method, the threshold value t will end up being set at an undesirable position, such as the position indicated by reference numeral 701. As a result, it is incorrectly determined that halation has not occurred in the pupil region in some cases.

Thus, if the degree of separation of the classes is a low value, there are cases where the halation occurrence state cannot be correctly determined.

In view of this, the image processing apparatus according to one or more embodiments of the present invention is provided with an exception in the halation determination using the threshold value t. According to this exception, a pattern in which halation correction is not to be performed regardless of the determination result, and a pattern in which halation correction is to be performed regardless of the determination result are defined.

Specifically, if the degree of separation in the brightness distribution of the pupil region is lower than a predetermined value and the average of the brightness values is lower than a predetermined value, it is determined that "halation correction is not to be performed (regardless of the determination result)". If the degree of separation of the classes is sufficiently low and the average of the brightness values is sufficiently low, it can be estimated that halation has not occurred in the first place.

Also, if the degree of separation in the brightness distribution of the pupil region is lower than a predetermined value and the average of the brightness values is higher than a predetermined value, it is determined that "halation correction is to be performed (regardless of the determination result)". This is because if the degree of separation of the classes is sufficiently low and the average of the brightness values is sufficiently high, it can be estimated that halation has occurred over most of the pupil region.

Processing Flowchart

Next, a processing flowchart for realizing the functions described above will be described.

Figure 8:
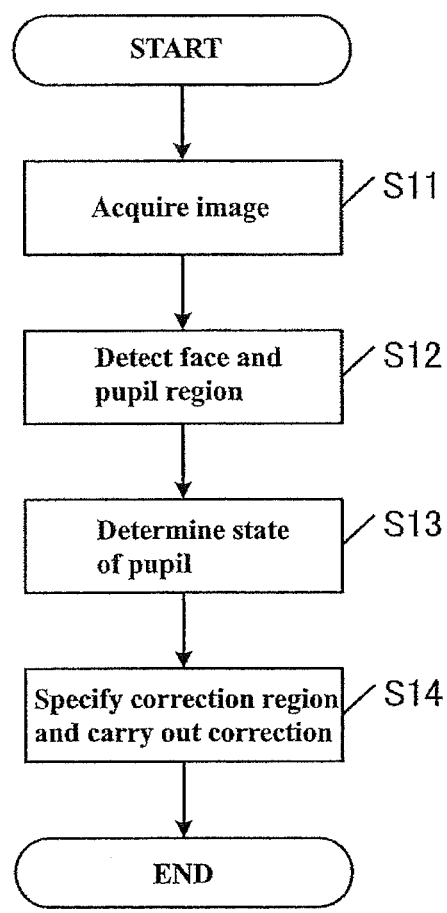
FIG. 8 is an image of a flowchart for processing performed by the image processing apparatus.

FIG. 8 is a processing flowchart for the image processing apparatus 10 according to one or more embodiments of the present invention. The processing is started by a user operation (e.g., an operation of loading a stored image). Note that in one or more embodiments of the present invention, processing for correcting red-eye and gold-eye is performed at the same time as halation correction processing. Processing for correcting red-eye and gold-eye will be described as needed.

First, in step S11, the image acquisition unit 11 acquires an image. In one or more embodiments of the present invention, an image stored in advance is acquired from a storage device, but the image may be acquired via a communication means or an image capturing means.

Figure 9:
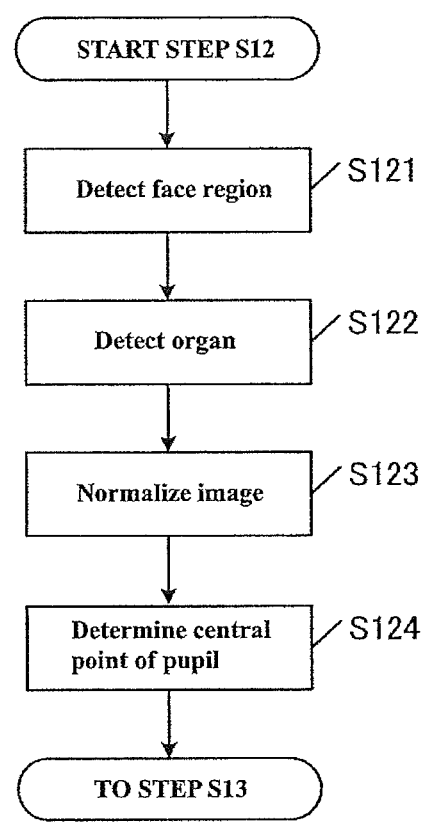
FIG. 9 is an image of a flowchart for describing face and pupil region detection processing in detail.

Next, in step S12, the pupil detection unit 12 extracts regions corresponding to a face and a pupil from the acquired image. FIG. 9 is a flowchart showing details of the processing performed in step S12. Steps S121 to S124 are executed by the pupil detection unit 12.

First, in step S121, a rectangular region (face region) corresponding to a face included in the image is extracted. Since the method for extracting the face region from the image is a publicly-known method, a detailed description thereof will not be given here.

Next, in step S122, an eye included in the face region is detected. Specifically, an RGB image corresponding to the face region is converted into a monochrome image, and feature points corresponding to the outer corner, inner corner, and center of the eye are extracted. With this step, a region for searching for a pupil is specified. Note that if feature points fail to be extracted, after filtering is performed, an eye may be detected using matching processing.

Next, in step S123, the image is normalized. Specifically, the face region is subjected to clipping so as to generate a rectangular image of a predetermined size that includes an eye. At this time, the resolution may be converted using an arbitrary interpolation method. Also, if the face region is not level, processing for rotating the image may be performed. Note that the processing of steps S123 to S124 is performed on one eye at a time.

Next, in step S124, the central point of the pupil, which is located in the detected eye, is searched for. Since the method for searching for the central point of the pupil is publicly-known, it will not be described in detail here. For example, it is possible to extract candidate points using a triple filter and determine that a candidate point with the highest score is the central point of the pupil.

Upon determining the central point of the pupil, a circular region of a predetermined size is generated around that point, resulting in a pupil region. The predetermined size may be a fixed size, and it may be a size that changes for each person. Also, the shape of the region may be circular, it may be elliptical and it may be another shape.

Figure 10:
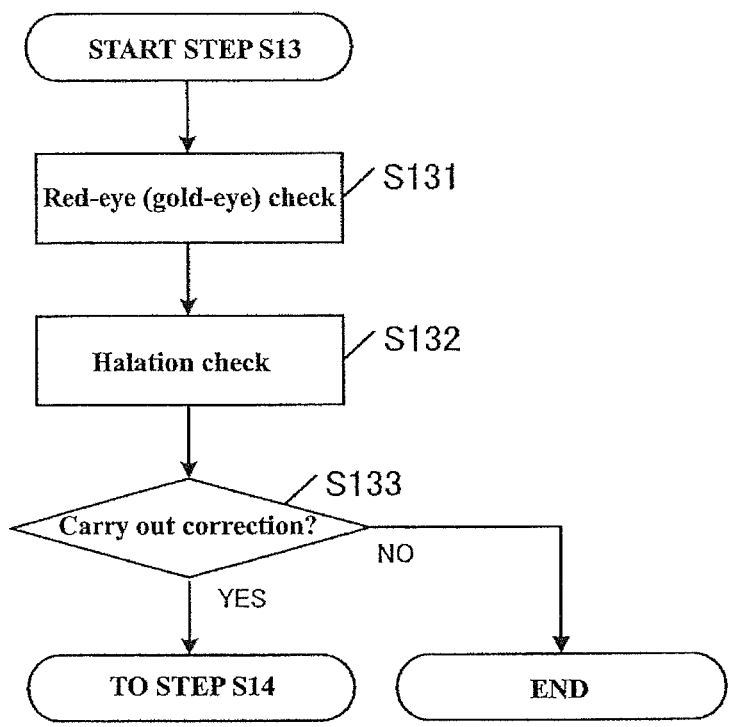
FIG. 10 is an image of a flowchart for describing processing for performing pupil state determination in detail.

Next, in step S13, the pupil state determination unit 13 determines the state of the pupil region. Since there are three types of tone defects and brightness defects that occur in a pupil, namely "red-eye", "gold-eye", and "halation", in this step, it is determined which of these types applies to the state of the pupil. FIG. 10 is a flowchart showing details of the processing performed in step S13. Note that "red-eye" or "gold-eye" and "halation" may occur at once. Steps S131 to S133 are executed by the pupil state determination unit 13. Note that the processing of step S13 is performed on one eye at a time.

Figure 11:
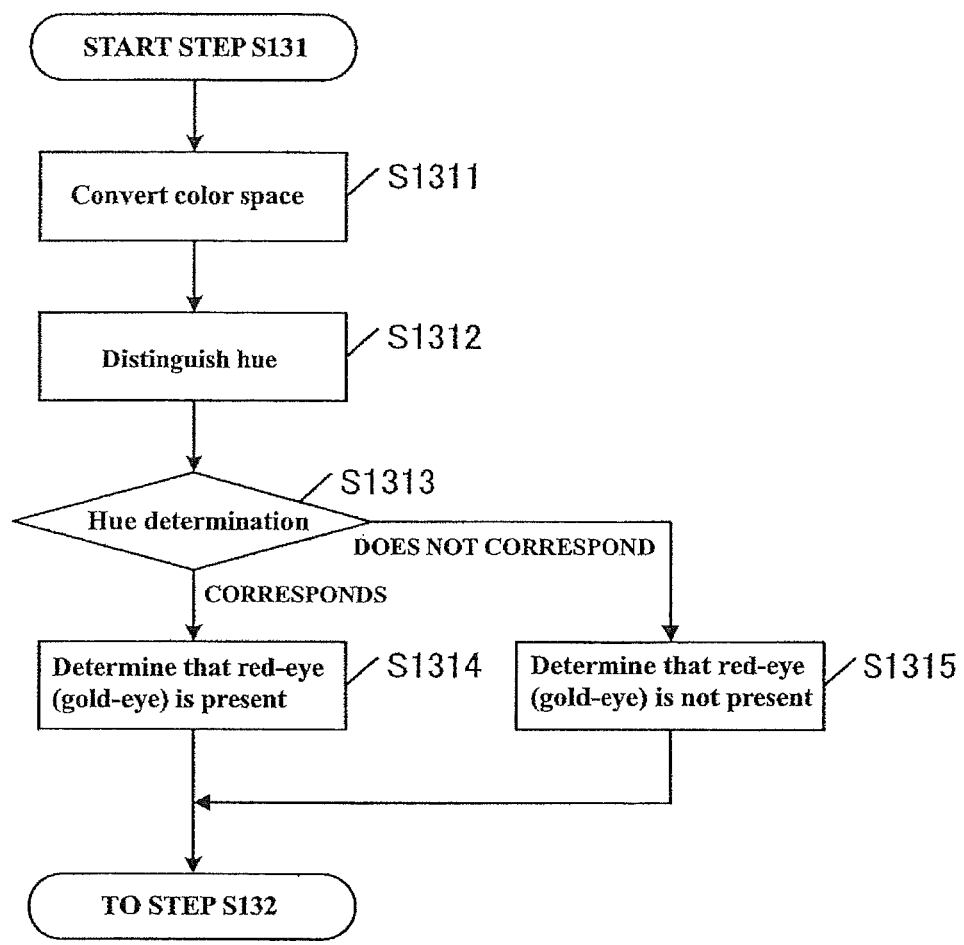
FIG. 11 is an image of a flowchart for describing red-eye and gold-eye checking processing in detail.

First, in step S131, it is checked whether or not a tone defect is visible in the pupil region, or in other words, whether or not red-eye or gold-eye has occurred. FIG. 11 is a flowchart showing details of the processing performed in step S131.

In step S1311, the color space of the image is converted from an RGB color space to a Lab color space.

Next, in step S1312, it is determined whether or not the pixels included in the pupil region satisfy one of the following conditions.

θ is between 350 degrees and 55 degrees and d is greater than or equal to 0.2 (if radius is 1)

θ ranges from 315 degrees to 350 degrees, and d is greater than or equal to 0.7 (if radius is 1)

Note that θ and d are parameters for color in the CIE Lab color system. In other words, it is determined whether or not the color of the pixels is red.

Next, in step S1313, it is determined whether or not the number of pixels that satisfy the above conditions makes up a predetermined percentage or more (e.g. 10% or more) of the pixels in the pupil region, and if it does, it is determined that red-eye has occurred in the pupil region (step S1314). Also, if not, it is determined that red-eye has not occurred in the pupil region (step S1315).

The determination of gold-eye can be performed using a method similar to the method used in the determination of red-eye. In the case of performing gold-eye determination, the color conditions need only be replaced with those corresponding to a gold color (yellow). For example, it is possible to use the following condition.

θ ranges between 65 degrees and 115 degrees, and d is greater than or equal to 0.2 (if radius is 1).

Note that in one or more embodiments of the present invention, the color space of the image is converted into Lab and the hue is determined thereafter, but the hue may be determined using another method.

Figure 12:
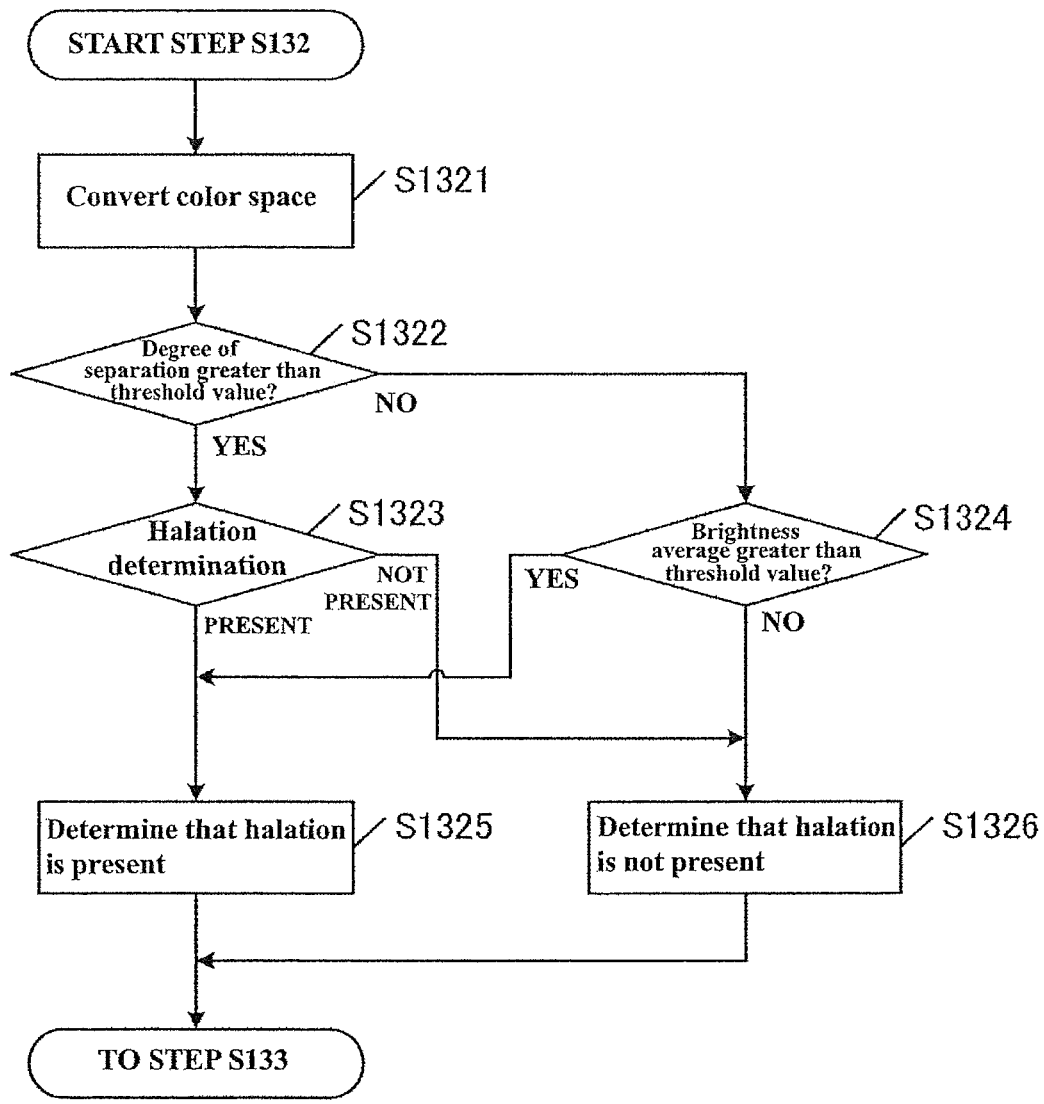
FIG. 12 is an image of a flowchart for describing halation checking processing in detail.

Step S132 is processing for checking whether or not halation has occurred in the pupil region. FIG. 12 is a flowchart showing details of the processing performed in step S132. Steps S1321 to S1326 are performed by the pupil state determination unit 13.

First, in step S1321, the color space of the image is converted from an RGB color space to greyscale.

Next, in step S1322, a threshold value t for separating the brightness values of the pixels included in the pupil region into a high brightness class and a low brightness class is calculated using discriminant analysis, and the degree of separation at that time is obtained. Consequently, if the obtained degree of separation is higher than a predetermined value, the processing moves to step S1323 to perform halation determination.

In step S1323, halation determination is performed using the threshold value t obtained in step S1322. In other words, the percentage, with respect to the whole, of pixels having a brightness exceeding the threshold value t is calculated, and if the obtained percentage is greater than or equal to a predetermined percentage, it is determined that halation has occurred (step S1325), and if it is smaller than a predetermined percentage, it is determined that halation has not occurred (step S1326).

If the degree of separation obtained in step S1322 is lower than a predetermined value, or in other words, the brightness distribution has not been sufficiently separated into a high brightness class and a low brightness class, it means halation has not occurred or halation has occurred in most of the pupil region. Therefore, in order to distinguish between these two states, the processing moves to step S1324.

In step S1324, the average of the brightness values of the pixels in the pupil region is acquired, and it is determined whether the average value is higher or lower than the predetermined value. If it is consequently determined that the average value is higher than the predetermined value, it can be estimated that halation has occurred in most of the pupil region, and therefore it is determined that halation has occurred (step S1325). On the other hand, if the average value is lower than the predetermined value, it is determined that halation has not occurred (step S1326).

The description will continue below, returning to FIG. 10. If, as a result of checking for red-eye and gold-eye and checking for halation, correspondence to at least one of these defects is determined in step S133, the processing moves to step S14. If no correspondence is determined, the processing is ended.

The description will continue below, returning to FIG. 8.

Figure 13:
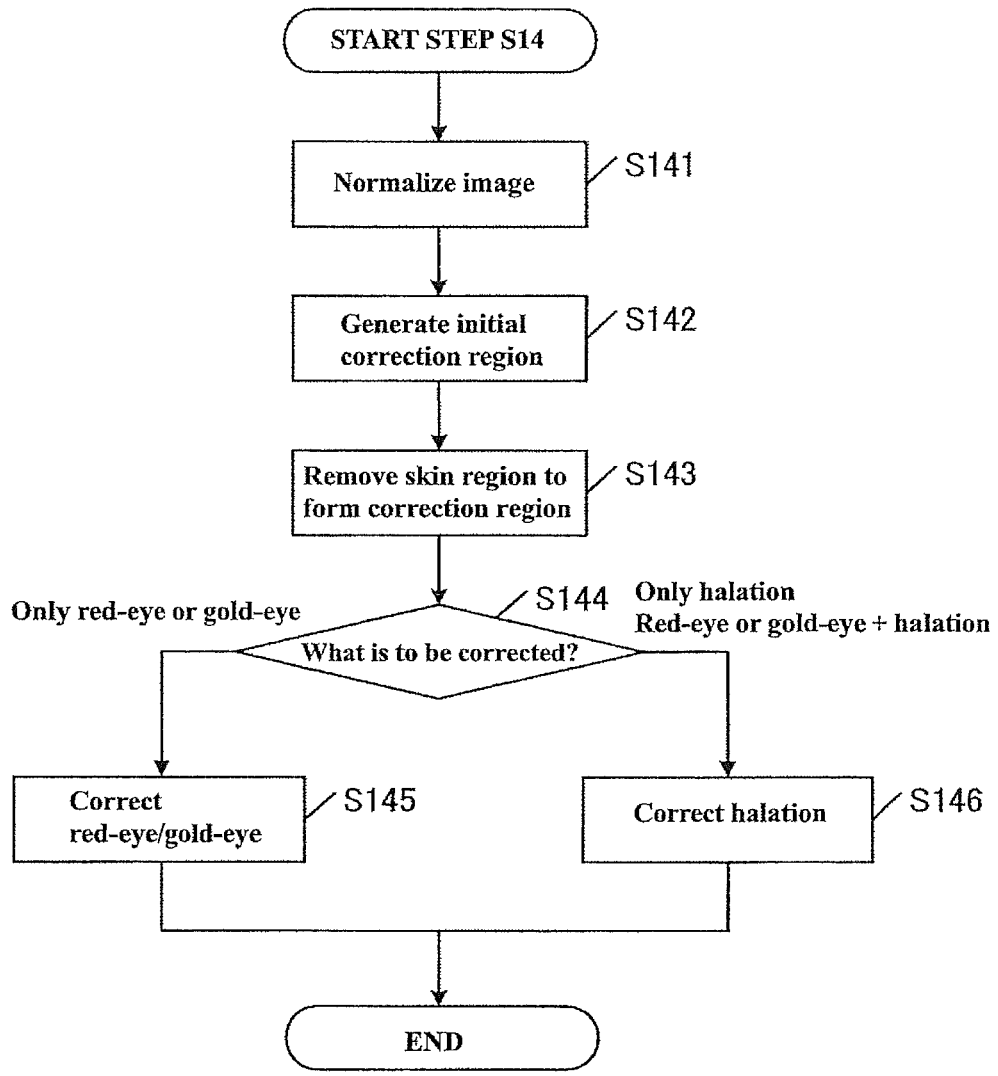
FIG. 13 is an image of a flowchart for describing image correction processing in detail.

In step S14, the correction unit 14 corrects the pupil region. FIG. 13 is a flowchart showing details of the processing performed in step S14. Steps S141 to S146 are executed by the correction unit 14. Note that the processing of step S14 is performed on one eye at a time.

First, in step S141, the image is normalized. Specifically, the face region is subjected to clipping so as to generate a rectangular image of a predetermined size that is centered about the central coordinates of the pupil. At this time, the resolution may be converted using any interpolation method. Also, if the face region is not level, processing for rotating the image may be performed.

Next, in step S142, a correction region is generated. A correction region is a region that is to be subjected to correction. The correction region generated here is an elliptical region having a predetermined size, centered about the central coordinates of the pupil. The correction region may be the same region as the pupil region.

Since there is a possibility that the correction region generated in step S142 includes skin, in step S143, the region corresponding to skin is removed so as to form a region. Specifically, a skin-colored region is detected using a Lab color space, and the corresponding region is deleted. At this time, information regarding the shape and arrangement may be used in addition to color information to delete the region corresponding to skin, and processing for removing noise may be added. Furthermore, it is also possible to perform multiple processes using different references and combine the processing results thereof. By executing this step, only the region corresponding to the interior of the eye is extracted.

In step S144, the processing branches according to the correction target. It is thought that performing the determination in step S13 results in three patterns, namely (1) red-eye or gold-eye, (2) halation, and (3) both. Among these, (1) can be addressed using only tone correction. However, with (2), information needs to be supplemented (halation correction) since brightness information and iris pattern information are lost due to halation. Furthermore, with (3) as well, halation correction needs to be performed with priority since brightness information is lost.

Accordingly, if (1) is the only determination result, red-eye correction or gold-eye correction is performed (step S145), and if (2) or (3) is the determination result, halation correction is performed (step S146).

Red-eye or gold-eye can be corrected using a known method for changing tone.

A method for correcting halation will be described below.

One method for correcting halation is a method in which an image of a pupil in a normal state is pasted on a region in which halation has occurred. For example, a pupil image for correction is stored in advance, and the pupil image is pasted on the region in which halation has occurred. In this case, processing for optimizing the size by scaling may be performed, and clipping processing may be performed. Also, tone correction for matching the color of the pupil, and brightness correction for matching the brightness may be performed.

Also, it is possible to select, from pupil images of multiple sizes, a pupil image whose size matches. Furthermore, it is possible to select, from multiple pupil images having different pupil colors, a pupil image whose pupil color matches.

Note that according to one or more embodiments of the present invention, the pupil image for correction is an average pupil image generated from a pupil (iris) region image extracted in advance from a large number of face images of a person.

Also, if halation has occurred in only one of the eyes, the pupil image may be acquired from the eye on the side in which halation did not occur.

In this way, halation correction can be performed by pasting an image of a pupil in a normal state on the region in which halation has occurred. As for case (3), by pasting the image, the tone abnormality (red-eye or gold-eye) can also be corrected at the same time. Note that halation correction and tone correction may be performed separately.

In one or more of the embodiments described above, a threshold value for determining whether or not halation has occurred is set dynamically based on the bias of the distribution of brightness values in the pupil region. Accordingly, even if the brightness distribution is biased, it is possible to accurately determine the occurrence of halation. Also, if the degree of separation in the brightness distribution is low, it is estimated whether or not halation has occurred without using a threshold value. Accordingly, cases in which determination using a threshold value is not appropriate can be excluded, and the determination accuracy can be improved.

Modification

The above-described embodiments are merely examples, and the present invention can be suitably modified and implemented without departing from the spirit of the invention.

For example, in the description of one or more of the embodiments, a description was given taking, as an example, an image processing apparatus that performs processing on an image stored in a storage device. However, the image does not necessarily need to be acquired from a storage device, and for example, an image may be acquired from an external apparatus via a wired or wireless network.

Also, the image may be acquired via a built-in camera. One or more embodiments of the present invention can be implemented as an image capturing apparatus configured to perform processing on a captured image.

Also, the extent and method of correction at the time of performing halation correction or tone correction may be determined separately. For example, the hue change amount at the time of correcting red-eye may be determined based on the result of executing step S131. Also, in step S131, it is possible to detect the color of a person's pupil and select a partial image of a pupil to be used at the time of halation correction based on the detection result.

Also, in the description of one or more of the embodiments, an example was given in which processing is performed on one eye at a time, but processing may be performed on both eyes at a time. Also, if red-eye/gold-eye or halation has occurred in only one eye, information regarding correction (e.g., pupil color, pupil size, etc.) may be acquired by referencing the pupil on the opposite side.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

LIST OF REFERENCE NUMERALS

10 Image processing apparatus
11 Image acquisition unit
12 Pupil detection unit
13 Pupil state determination unit
14 Correction unit
15 Input/output unit

What is claimed is:

1. An image processing apparatus configured to correct at least part of a face image, comprising:
an image acquisition unit that acquires an input image;
a region extraction unit that extracts a pupil region, which is a region corresponding to an eye of a person, from the input image;
a pixel extraction unit that extracts a pixel from the pupil region whose brightness value is higher than a threshold value;
a determination unit that determines, based on the result of extraction performed by the pixel extraction unit, whether or not halation has occurred in the pupil region; and
a correction unit that performs, based on the result of determination performed by the determination unit, processing for correcting halation on the pupil region,
wherein the pixel extraction unit sets the threshold value based on a bias of a brightness distribution of the pixels included in the pupil region,
wherein the threshold value is a value according to which the brightness distribution of the pixels included in the pupil region is separated into a high brightness class and a low brightness class,
wherein the determination unit calculates a degree of separation, which is a ratio between an intra-class variance and an inter-class variance in the brightness distribution of the pixels included in the pupil region and sets the threshold value to a value according to which the degree of separation is maximized, and
wherein, if the degree of separation is less than or equal to a predetermined value and the average of the brightness values of the pixels included in the pupil region is greater than or equal to the predetermined value, the correction unit performs halation correction processing regardless of the result of the determination performed by the determination unit.

2. The image processing apparatus according to claim 1, wherein, if the pixels extracted by the pixel extraction unit make up a predetermined percentage or more of the pixels in the pupil region, the determination unit determines that halation has occurred in the pupil region.

3. The image processing apparatus according to claim 1, wherein, if the degree of separation is less than or equal to a predetermined value and the average of the brightness values of the pixels included in the pupil region and is less than or equal to the predetermined value, the correction unit does not perform halation correction processing regardless of the result of the determination performed by the determination unit.

4. The image processing apparatus according to claim 1, wherein the correction unit stores a pupil image corresponding to a pupil region, and
wherein, if halation occurs in a pupil region, the correction unit performs halation correction by pasting the corresponding pupil image on the target pupil region.

5. The image processing apparatus according to claim 4, wherein the correction unit deforms the pupil image into a shape matching that of a target pupil region and thereafter pastes it on the pupil region.

6. The image processing apparatus according to claim 4, wherein the correction unit corrects the pupil image to a tone matching that of a target pupil region and thereafter pastes it on the pupil region.

7. The image processing apparatus according to claim 1, wherein, if halation occurs in a first pupil region and halation does not occur in a second pupil region that is a pupil region of an eye opposite to that of the first pupil region, the correction unit performs halation correction by pasting a pupil image acquired from the second pupil region on the first pupil region.

8. An image processing apparatus configured to correct halation that has occurred in a face image, the image processing apparatus comprising:
an image acquisition unit that acquires an input image;
a region extraction unit that extracts a pupil region, which is a region corresponding to an eye of a person, from the input image;
a determination unit that determines whether or not halation has occurred in the pupil region; and
a correction unit that performs, in the case where halation has occurred in the pupil region, correction by pasting a corresponding pupil image on the target pupil region,
wherein threshold value is a value according to which brightness distribution of pixels included in the pupil region is separated into a high brightness class and a low brightness class,
wherein the determination unit calculates a degree of separation, which is a ratio between an intra-class variance and an inter-class variance in the brightness distribution of the pixels included in the pupil region and sets the threshold value to a value according to which the degree of separation is maximized, and
wherein, if the degree of separation is less than or equal to a predetermined value and the average of the brightness values of the pixels included in the pupil region is greater than or equal to the predetermined value, the correction unit performs halation correction processing regardless of the result of the determination performed by the determination unit.

9. An image processing method that corrects at least part of a face image, comprising:
an image acquisition step of acquiring an input image;
a region extraction step of extracting a pupil region, which is a region corresponding to an eye of a person, from the input image;
a pixel extraction step of extracting a pixel from the pupil region whose brightness value is higher than a threshold value;
a determination step of determining whether or not halation has occurred in the pupil region based on the result of extraction performed in the pixel extraction step; and
a correction step of performing processing for correcting halation with respect to the pupil region, based on the result of determination performed in the determination step,
wherein in the determination step, the threshold value is set based on a bias of a brightness distribution of the pixels included in the pupil region,
wherein the threshold value is a value according to which the brightness distribution of the pixels included in the pupil region is separated into a high brightness class and a low brightness class,
wherein the determination step comprises calculating a degree of separation, which is a ratio between an intra-class variance and an inter-class variance in the brightness distribution of the pixels included in the pupil region and setting the threshold value to a value according to which the degree of separation is maximized, and
wherein, if the degree of separation is less than or equal to a predetermined value and the average of the brightness values of the pixels included in the pupil region is greater than or equal to the predetermined value, the correction step includes performing halation correction processing regardless of the result of the determination performed by the determination step.

10. A non-transitory computer readable storing medium recording an image processing program for causing a computer to perform a method comprising:
an image acquisition step of acquiring an input image;
a region extraction step of extracting a pupil region, which is a region corresponding to an eye of a person, from the input image;
a pixel extraction step of extracting a pixel from the pupil region whose brightness value is higher than a threshold value;
a determination step of determining whether or not halation has occurred in the pupil region based on the result of extraction performed in the pixel extraction step; and
a correction step of performing processing for correcting halation with respect to the pupil region, based on the result of determination performed in the determination step,
wherein in the determination step, the threshold value is set based on a bias of a brightness distribution of the pixels included in the pupil region, wherein the threshold value is a value according to which the brightness distribution of the pixels included in the pupil region is separated into a high brightness class and a low brightness class,
wherein determination step comprises calculating a degree of separation, which is a ratio between an intra-class variance and an inter-class variance in the brightness distribution of the pixels included in the pupil region and setting the threshold value to a value according to which the degree of separation is maximized, and
wherein, if the degree of separation is less than or equal to a predetermined value and the average of the brightness values of the pixels included in the pupil region is greater than or equal to the predetermined value, the correction step includes performing halation correction processing regardless of the result of the determination performed by the determination step.

* * * * *